Jan. 27, 1931. H. V. REED 1,790,284
FRICTION CLUTCH
Filed March 11, 1927 2 Sheets-Sheet 1

Jan. 27, 1931.　　　　H. V. REED　　　　1,790,284
FRICTION CLUTCH
Filed March 11, 1927　　2 Sheets-Sheet 2
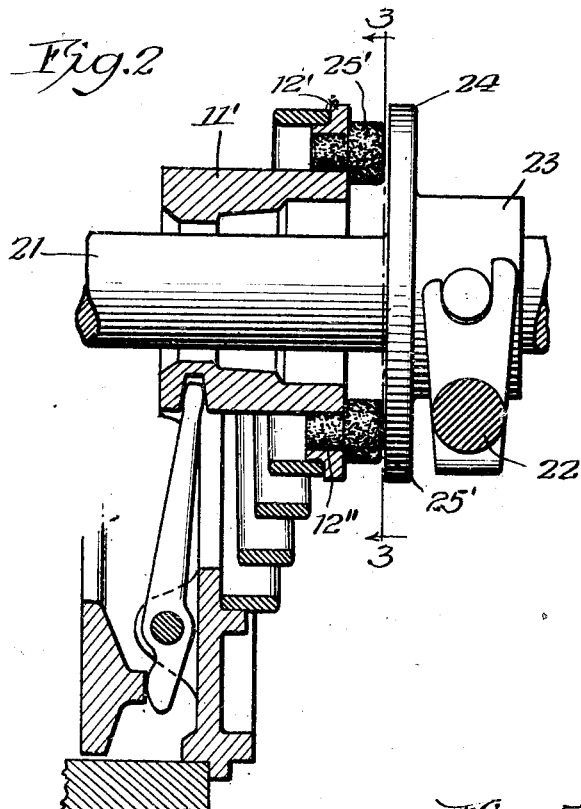
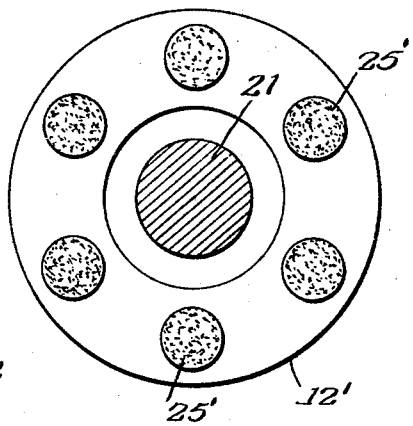
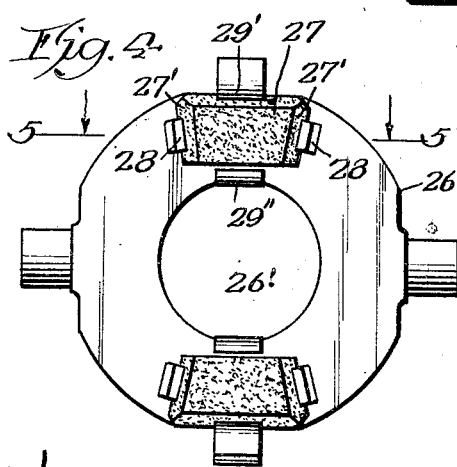
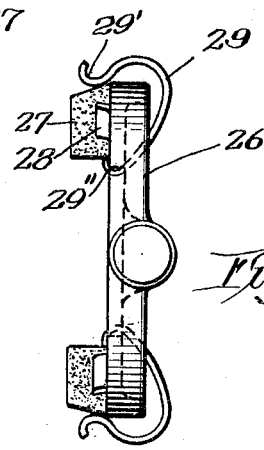

Patented Jan. 27, 1931

1,790,284

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

FRICTION CLUTCH

Application filed March 11, 1927. Serial No. 174,467.

This invention relates to friction clutches and its object is to provide novel and improved arrangement of antifriction means between the clutch levers and the clutch release device whereby the operation of the clutch is simplified and improved.

And a further object of the invention is to provide antifriction means which can be readily and easily replaced as required.

In the accompanying drawings illustrating a selected embodiment of the invention:

Fig. 2 is a detail sectional view showing the antifriction buttons carried by the clutch sleeve.

Fig. 3 is a sectional view on the line 3—3 of Fig. 2.

Fig. 4 is a plan elevation of another embodiment of the invention with a release plate having the antifriction devices thereon.

Fig. 5 is a sectional view on the line 5—5 of Fig. 4.

Fig. 6 is an end elevation of Fig. 4.

Figure 1:
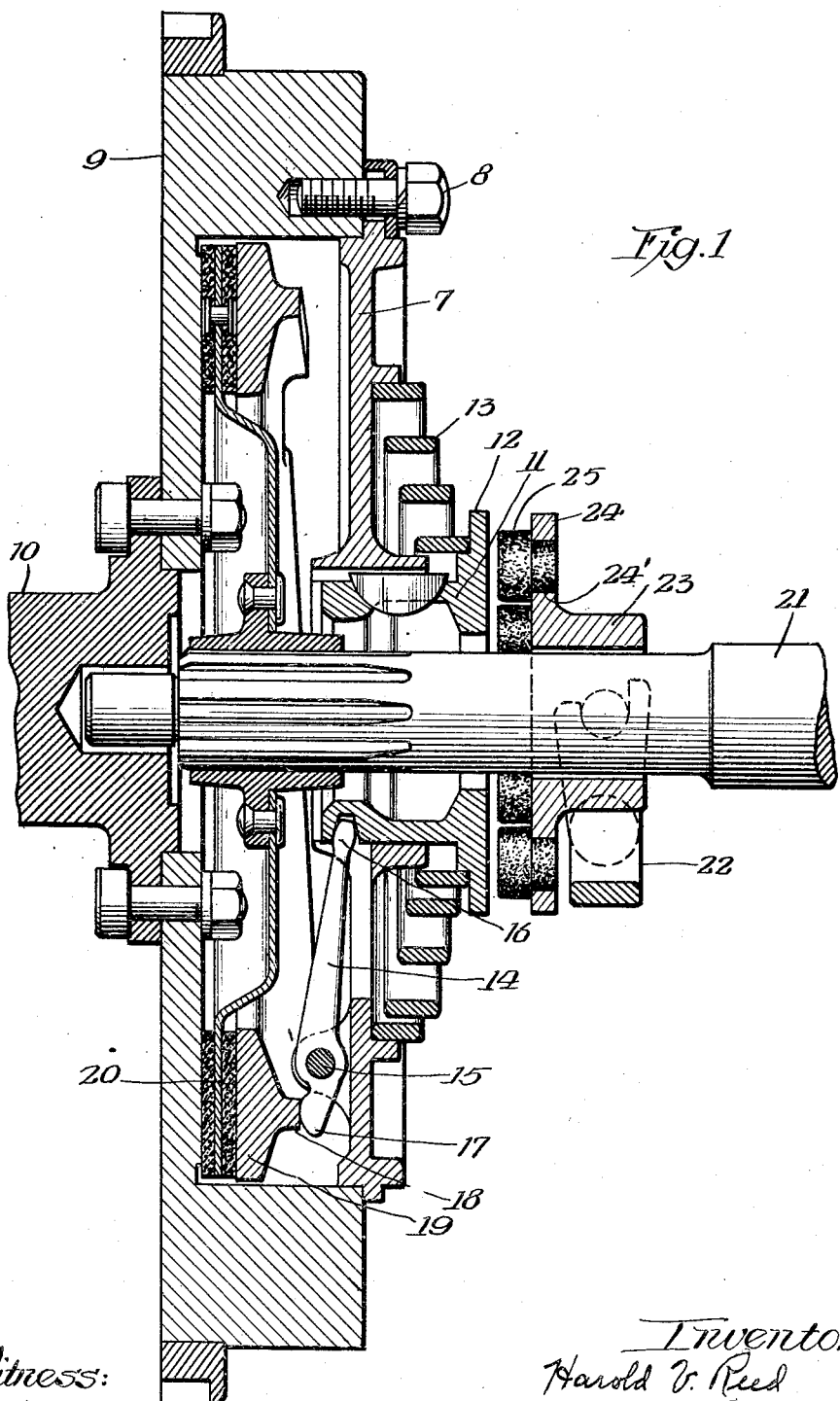
Fig. 1 is a sectional view of a clutch embodying the invention and with antifriction buttons carried by the release device.

Referring to the drawings 7 is the cover plate of the clutch and it is secured by bolts 8 to the flywheel 9 mounted on the driving or crank shaft 10. The cover plate is mounted on and keyed to a sleeve 11 which is provided with a peripheral flange 12, and a spring 13 is arranged between the cover plate and the flange. Clutch levers 14 are pivoted at 15 on the cover plate with their inner ends 16 engaged with the sleeve and their outer ends 17 bearing upon lugs 18 on the pressure ring 19. The spring normally presses the sleeve outward thereby causing the clutch levers to force the pressure ring inward and press the friction faced clutch or driven plate 20 into operative engagement with the flywheel. The clutch or driven plate is rigidly mounted on the driven shaft 21.

In Figs. 1 and 2 the clutch release device is adapted to be operated by the release lever 22 and comprises a collar 23 having a plate thereon disposed opposite the flange 12 forming, in effect, a corresponding plate face or end for the sleeve 11. Buttons 25 of some suitable antifriction bearing material, such as a graphite composition, are mounted on the clutch release plate 24 and are adapted to operatively engage the plate end of the clutch sleeve. In Figs. 2 and 3 the antifriction buttons 25' are mounted on the plate end 12' of the clutch sleeve 11'. The antifriction buttons are circular in shape and are provided with reduced portions to fit in the openings 24' in the clutch release plate 24 (Fig. 1) or the openings 12'' in the sleeve 11' (Fig. 2).

In Figs. 4–6 I have shown a clutch release device 26 upon which the antifriction buttons 27 are detachably held between lugs 28 by the spring yokes 29. The lugs 28 are inclined inwardly and forwardly towards each other. The antifriction buttons 27 have beveled ends 27' and they are adapted to be arranged in position between the lugs, entering them from the periphery of the clutch release device plate 26. The spring yoke has an end 29' to engage the antifriction device and a bent end 29'' to engage the clutch release device plate, which is provided with a central opening 26' to receive the driven shaft 21. The spring yoke can be readily engaged with the edge of the plate 26 about the opening 26' and snapped over the periphery of the plate to engage the antifriction button for holding it between the lugs 28; and the yoke can be readily snapped back away from the button and the periphery of the plate and disengaged from the plate to release the button and permit its removal.

The invention provides an improved friction clutch of simple construction which can be inexpensively produced and easily assembled, which is efficient in operation and can be maintained at low cost.

I have illustrated the invention in one type of clutch in the accompanying drawings, but I reserve the right to use the invention in other clutches and to make all such changes as may be necessary or desirable for adapting it to other clutches or for other purposes, within the scope of the following claims.

I claim:

1. The combination of a clutch release plate, an antifriction button, means on the plate to receive the button and detachable means for securing the button to the plate.

2. The combination of a clutch release plate, an antifriction button, means on the plate to receive the button, and a spring yoke adapted to be engaged with the plate and with the button to secure the button on the plate.

3. The combination of a clutch release plate, converging lugs on the plate, an antifriction button having beveled faces to engage said lugs, and means for securing the button on the plate.

4. The combination of a clutch release plate, converging lugs on the plate, a button having beveled surfaces to engage said lugs, and a spring yoke engaging the plate and also engaged with the button to hold it on the plate between the lugs.

5. In a friction clutch, the combination of a sleeve having an annular flange plate at one end thereof, a clutch release device comprising a collar and an annular flange plate on the collar, the flange plate on the sleeve and the flange plate on the collar having opposing parallel plane faces, one of said plates having a plurality of openings therein, and antifriction buttons having reduced portions seated in said openings and heads arranged to engage the opposing flange plate, said button heads being enlarged and forming shoulders which engage the flange plate upon which the buttons are mounted.

HAROLD V. REED.